Oct. 19, 1926.

W. S. HARLEY 1,603,596

HUB PROTECTOR

Filed Nov. 5, 1920

Inventor
William S. Harley
Edwin B. H. Tower Atty.

Patented Oct. 19, 1926.

1,603,596

UNITED STATES PATENT OFFICE.

WILLIAM S. HARLEY, OF MILWAUKEE, WISCONSIN, ASSIGNOR TO HARLEY-DAVIDSON MOTOR CO., OF MILWAUKEE, WISCONSIN, A CORPORATION OF WISCONSIN.

HUB PROTECTOR.

Application filed November 5, 1920. Serial No. 422,099.

This invention relates to hub protectors.

While the invention is particularly applicable to wheel hubs for motor cycles, it is also applicable to other bearings wherein it is desired to exclude dirt or other deleterious particles and to retain the lubricant therefor.

One of the objects of this invention is to provide an improved hub protector for protecting a bearing from dirt and other objectionable particles.

A further object is to provide a protector for a hub which effectively excludes dirt from the bearing and practically prevents the escape of oil or other lubricant therefrom.

A further object is to provide a hub protector which is readily applied and adjusted.

A further object is to provide a frictionless dirt guard for bearings.

A further object is to provide a dirt guard wherein a clean dry exterior and gritless interior is maintained by the aid of centrifugal force.

A further object is to provide a dirt guard for bearings which is economical to manufacture.

A further object is to provide a hub protector for bearings which may be readily inspected, cleaned or repaired.

A further object is to provide a dirt guard for bearings which may be made of pressed steel thereby avoiding expensive machine work.

A further object is to provide a guard for bearings in which a substantial seal is formed against water.

A further object is to provide a hub dirt guard for bearings, having a movable and stationary member, wherein the bearings may be adjusted without interfering with the protector.

A further object is to provide a dirt guard for bearings which eliminates the necessity for the use of felt washers, packing or the like.

Other objects and advantages will be apparent from the following specification.

The views of the drawings are:

In accordance with the invention, an inner annular guard is mounted at its outer periphery to rotate with a hub, and an outer stationary annular guard is mounted near its inner periphery on an axle adjacent the inner guard. There is thus formed a plurality of spaced passages communicating with each other and so arranged as to afford an efficient means for excluding dirt and dust from the bearing while retaining the lubricant therein.

Figure 1:
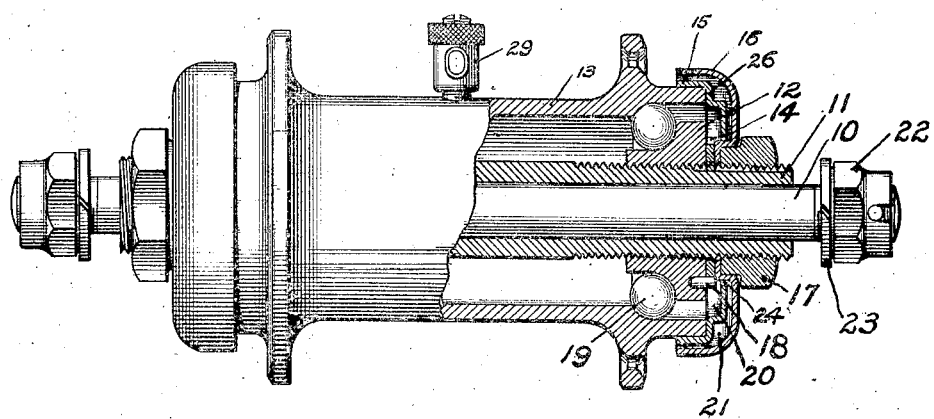
Figure 1 is an elevation, partly in section, showing the protector in position upon a hub.
Figure 2:
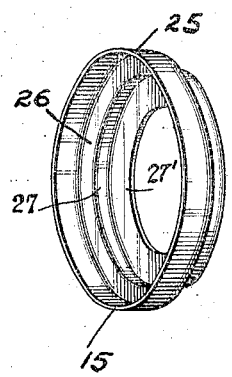
Figure 2 is a perspective of the inner protector or guard.
Figure 3:
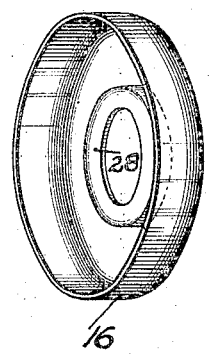
Figure 3 is a perspective of the outer protector or guard.

The dust guard is shown in Figure 1 as being mounted on a bushing 11 through which extends a hub axle 10 which may be suitably positioned in the forks (not shown) of a motor cycle, by means of the nut 22 and washer 23.

The inner guard 15 is mounted to rotate with the hub shell 13. The stationary outer shell 16 is mounted on the bushing 11 between an axle bushing nut 17 and a lock washer 14. The lock washer 14 serves to lock a bearing cone 12 in adjusted position on the bushing 11. The washer 14 is provided with a lip which extends within a longitudinally extending slot in the bushing 11. A pin 18 fixed in the cone projects in a detent of the washer and serves to maintain the bearing cone in a given position.

The movable inner guard 15 arranged adjacent to the stationary outer guard 16 provides a plurality of chambers 20 and 21 spaced from, which in practice, by reason of the absence of a felt washer or the like, will communicate with each other through the clearance 24. The inner chamber 20 communicates with the ball bearings 19 arranged between cone 12 and the hub shell 13. The outer chamber 21 leads to the exterior of the hub.

The inner guard 15 is preferably formed as an annular member of thin pressed steel. The outer periphery 25 of the inner protector extends for a certain distance parallel with the hub shell 13 and fits thereover, another portion of the protector being bent inwardly, to form a shoulder 26 abutting against the end of the hub shell 13 to limit the movement of the guard thereover. Another portion 27 of the inner guard is bent outwardly, forming an annular ring 27' which terminates at its center at a point spaced from the outer guard 16, a distance sufficient for clearance. By reason of the fact that the hub shell 13 and guard 15 rotate as a unit, a sufficiently tight fit may be had therebetween at the periphery of said hub shell 13 to effectually prevent the escape of lubricant.

The outer guard 16 is generally convex or cup-shaped, and adapted to telescope or overlie the inner guard 15, and is provided with a centrally depressed annular portion 28 which is positioned between the lock washer 14 and the axle bushing nut 17. When in assembled position, the outer chamber 21, formed between the inner and outer guards 15 and 16 respectively, extends in two directions, as for example a radial and axial direction. Such an arrangement renders it difficult and unlikely that rain or dirt will find its way within the hub. The centrifugal action of the revolving hub and the inner guard 15 will tend to hold the lubricant within the chamber 20, and thus prevent the escape thereof from the hub. On the other hand, centrifugal action on the exterior of the inner hub will tend to expel any particles from the hub and thus prevent particles of dirt or other material from entering the hub and finding their way to the bearings.

If by any chance, certain particles enter the chamber 21 and reach the passage 24, the tendency would be to there form, together with the lubricant, a thin film which would form a seal against entrance of moisture or dust particles to the bearings, and exit of the lubricant therefrom.

In order to supply lubricant to the ball bearings 19, an oil cup 29 of the usual construction may be mounted on the hub shell to communicate with the interior thereof.

While but one embodiment has been shown, this is to be construed in an illustrative and not in a limiting sense, as various changes and modifications may be made without departing from the spirit and scope of this invention.

The invention claimed is:

1. The combination of a stationary axle, a bushing thereon, a rotatable hub mounted on said bushing, a pair of substantially cup-shaped annular guards telescopically arranged, the inner guard being secured to the outer periphery of the hub to rotate therewith, and the outer guard being secured to the bushing and overlying the inner guard, said inner guard having a shoulder intermediate its inner and outer peripheries whereby pockets are formed on each side thereof.

2. The combination of a hub protector comprising a pair of substantially cup-shaped guards, a rotatable hub, a stationary axle, and a bushing thereon, one of said guards being secured to the outer periphery of said hub and rotatable therewith, and the other said guard being stationary and secured to said bushing, said guards co-operating to form a plurality of chambers whereby the egress of oil and ingress of dirt is prevented.

3. In combination a stationary axle and bushing mounted thereon, a rotatable hub, a bearing between said hub and axle, a disk shaped guard enclosing said bearing and having a flange attached to the outer periphery of said hub, and another guard surrounding said first guard and secured to said bushing whereby a plurality of chambers are formed to retain lubricant for the bearing and to prevent the accumulation of dirt therein.

4. The combination of a hub protector comprising a pair of annular guards, a stationary axle and bushing therefor, a rotatable hub, a bearing race formed between said hub and axle, one of said guards being provided with an outer peripheral flange adapted to be secured to the outer periphery of said rotatable hub, and the other guard enclosing said first mentioned guard and attached to the bushing, said guards co-operating to form a plurality of communicating chambers whereby the egress of oil and the ingress of dirt is prevented.

In witness whereof, I have hereunto subscribed my name.

WILLIAM S. HARLEY.